US008900490B2

(12) United States Patent
Taniguchi et al.

(10) Patent No.: US 8,900,490 B2
(45) Date of Patent: Dec. 2, 2014

(54) TITANIC ACID COMPOUND, PROCESS FOR PRODUCING THE TITANIC ACID COMPOUND, ELECTRODE ACTIVE MATERIAL CONTAINING THE TITANIC ACID COMPOUND, AND STORAGE DEVICE USING THE ELECTRODE ACTIVE MATERIAL

(75) Inventors: Hirofumi Taniguchi, Yokkaichi (JP); Masatoshi Honma, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 827 days.

(21) Appl. No.: 12/675,193

(22) PCT Filed: Aug. 27, 2008

(86) PCT No.: PCT/JP2008/065299

§ 371 (c)(1),
(2), (4) Date: Feb. 25, 2010

(87) PCT Pub. No.: WO2009/028553

PCT Pub. Date: Mar. 5, 2009

(65) Prior Publication Data

US 2010/0243968 A1    Sep. 30, 2010

(30) Foreign Application Priority Data

Aug. 30, 2007   (JP) .................................. 2007-223722

(51) Int. Cl.
*H01B 1/02* (2006.01)
*B82Y 30/00* (2011.01)
(Continued)

(52) U.S. Cl.
CPC ................. *C01G 23/00* (2013.01); *B82Y 30/00* (2013.01); *C01G 23/047* (2013.01); *C01G* (Continued)

(58) Field of Classification Search
CPC .................................. H01B 1/02; C01G 23/00

USPC ......... 252/520.2, 182.1; 423/608, 512.1, 598; 429/231.5

See application file for complete search history.

(56) References Cited

U.S. PATENT DOCUMENTS 4,448,493 A * 5/1984 Matsudaira et al. .......... 359/268
2006/0097230 A1   5/2006 Hareyama et al.

FOREIGN PATENT DOCUMENTS

JP    2007-137686 A    6/2007
JP    2007-220406      8/2007
(Continued)

OTHER PUBLICATIONS

Kazutaka Chiba et al., "Soft Kagakuteki Shuho . . . To Denki Kagaku Tokusei", The Electrochemical Society of Japan, Dai 74 Kai Taikai Koen Yoshishu, Mar. 29, 2007, p. 230.

(Continued)

*Primary Examiner* — Bijan Ahvazi
(74) *Attorney, Agent, or Firm* — Paul E. White, Jr.; Manelli Selter PLLC (57) ABSTRACT

This invention provides a titanic acid compound-type electrode active material having a high battery capacity and, at the same time, having excellent cycle characteristics. The titanic acid compound exhibits an X-ray diffraction pattern corresponding to a bronze-type titanium dioxide except for a peak for a (003) face and a (−601) face and having a lattice spacing difference between the (003) face and the (−601) face, i.e., $d_{(003)} - d_{(-601)}$, of not more than 0.0040 nm. The titanic acid compound may be produced by reacting a layered alkali metal titanate, represented by a compositional formula $M_xM'_{x/3}Ti_{2-x/3}O_4$ wherein M and M', which may be the same or different, represent an alkali metal; and x is in the range of 0.50 to 1.0, with an acidic compound and then heating the reaction product at a temperature in the range of 250 to 450° C.

6 Claims, 2 Drawing Sheets

(51) Int. Cl.
    *C01G 23/047* (2006.01)
    *C01G 23/00* (2006.01)
    *H01M 4/131* (2010.01)
    *H01M 10/052* (2010.01)
    *C01G 23/04* (2006.01)
    *H01M 4/485* (2010.01)
    *C01G 25/02* (2006.01)
    *C01G 27/02* (2006.01)

(52) U.S. Cl.
    CPC .. 23/005 (2013.01); *C01P 2006/60* (2013.01); *H01M 4/131* (2013.01); C01G 23/002 (2013.01); *C01P 2006/40* (2013.01); H01M 10/052 (2013.01); *C01P 2004/61* (2013.01); *C01P 2004/62* (2013.01); *C01P 2006/12* (2013.01); *C01P 2002/72* (2013.01); *C01P 2002/77* (2013.01); C01G 23/04 (2013.01); H01M 4/485 (2013.01); *Y02E 60/122* (2013.01); *C01P 2004/64* (2013.01); *C01P 2002/78* (2013.01)
    USPC ............. 252/520.2; 252/182.1; 423/512.1; 423/598; 423/608; 429/231.5

(56) References Cited

FOREIGN PATENT DOCUMENTS

| | | |
|---|---|---|
| JP | 2008 117625 | 5/2008 |
| JP | 2008-117625 A | 5/2008 |
| JP | 2008 255000 | 10/2008 |
| TW | 200407461 | 5/2004 |
| WO | WO 2008/111465 A | 9/2008 |

OTHER PUBLICATIONS

Kazutaka Chiba et al., Soft Kagakuteki Shuho . . . To Denki Kagaku Tokusei, Dai 47 Kai Battery Symposium in Japan Koen Yoshishu, Nov. 20, 2006, pp. 602-603.

T. P. Feist et al., "The Soft Chemical Synthesis . . . Titanates," J. of Solid State Chemistry, 1992, V. 101, p. 275-295.

S. Yin et al., "Phase transformation of protonic . . . solvothermal conditions," J. of Materials Chemistry, 1999, V. 9, p. 1191-1195.

T. Sasaki et al., "Protonated pentatitanate: preparation, . . . cation intercalatioin," Chemistry of Materials, 1992, V. 4, No. 4, p. 894-899.

Corcoran, D.J.D. et al. "Hydrogen titanates as potential proton conducting fuel cell electrolytes", Solid State Ionics, North Holland Pub. Co., Amsterdam, NL, vol. 136-137, Nov. 2, 2000, pp. 297-303.

\* cited by examiner

TITANIC ACID COMPOUND, PROCESS FOR PRODUCING THE TITANIC ACID COMPOUND, ELECTRODE ACTIVE MATERIAL CONTAINING THE TITANIC ACID COMPOUND, AND STORAGE DEVICE USING THE ELECTRODE ACTIVE MATERIAL

This application is the national phase of international application PCT/JP2008/065299 filed 27 Aug. 2008 which designated the U.S.

TECHNICAL FIELD

The present invention relates to a titanic acid compound having a specified crystal structure, a process for producing the titanic acid compound, an electrode active material using the titanic acid compound, and an electric storage device using the electrode active material.

BACKGROUND ART

The titanic acid compound is a compound containing at least titanium and oxygen; and such a compound is known to include, for example, titanic acid, titanium oxide and titanium hydroxide. Titanium oxide is known to include titanium dioxide having a crystal structure of rutile type, anatase type or brukite type, and titanium dioxide having a crystal structure called bronze type (Non-patent Document 1) has recently been reported. On the other hand, the lithium battery has rapidly spread recently because of a high energy density and excellent cycle characteristics, and an electrode active material is demanded which is more inexpensive and more easily available than lithium.transition metal composite oxides generally used. As such an electrode active material, a titanic acid compound attracts attention; and for example, use of the bronze-type titanium dioxide (Non-patent Document 2) and a layered titanic acid compound having a specified composition (Patent Document 1) is known to provide a lithium battery having a high capacity.

NON-PATENT DOCUMENT 1: Thomas P. Feist, et al., "The soft Chemical Synthesis of TiO2(B) from Layered Titanates", Journal of Solid State Chemistry 101 (1992), 275-295

NON-PATENT DOCUMENT 2: Kazuki Chiba et al., "Synthesis of a layered titanic acid compound by soft chemical means, and electrochemical characteristics thereof", Proceedings of the 47th Battery Symposium, Nov. 21, 2006, Lecture No. 2P-08

PATENT DOCUMENT 1: JP 2007-220406A

DISCLOSURE OF THE INVENTION

Problems to be Solved by the Invention

However, even if the titanic acid compounds described in Non-patent Document 2, Patent Document 1 and the like are used as an electrode active material, there are such problems that the battery capacity is insufficient; the cycle characteristics are poor; and the battery capacity largely decreases in repeated charge and discharge.

Means for Solving the Problems

As a result of exhaustive studies to solve such problems, the present inventors have found a novel titanic acid compound having a crystal structure with a specified composition, and further found that a battery using the titanic acid compound as an electrode active material exhibits a high battery capacity and excellent cycle characteristics. These findings have led to the completion of the present invention.

That is, the present invention is a titanic acid compound having an X-ray diffraction pattern equivalent to that of a bronze-type titanium dioxide except for peaks of a (003) plane and a (−601) plane and having a difference between spacings of the (003) plane and the (−601) plane, ($d_{(003)}-d_{(-601)}$) of 0.0040 nm or lower.

Advantages of the Invention

The titanic acid compound according to the present invention, if used especially as an electrode active material, provides excellent battery characteristics and particularly a high capacity and excellent cycle characteristics.

BEST MODE FOR CARRYING OUT THE INVENTION

The present invention is a titanic acid compound, and is characterized in that the titanic acid compound having an X-ray diffraction pattern equivalent to that of a bronze-type titanium dioxide except for peaks of a (003) plane and a (−601) plane and has a difference between spacings of the (003) plane and the (−601) plane, ($d_{(003)}-d_{(-601)}$) of 0.0040 nm or lower. The X-ray diffraction pattern corresponding to the bronze-type titanium dioxide is indicated by JCPDS cards 35-0088, 46-1237 and 46-1238; and in the X-ray diffraction pattern using Cu—Kα line as a ray source, two peaks of a (003) plane and a (−601) plane are observed in proximity to a diffraction angle (2θ) of 44°, and the differences between the spacings ($d_{(003)}-d_{(-601)}$) are 0.0046, 0.00443 and 0.00447 nm in the above-mentioned cards, respectively. By contrast, in the titanic acid compound according to the present invention, these two peaks are substantially overlapped, or the spacings are very proximate; and such a titanic acid compound has not been known conventionally. Specifically expressing such features, if an assumption is made in which, in the peaks in proximity to a diffraction angle of 44° observed in the present invention, a peak on the lower angle side corresponds to the (003) plane of the pattern of the bronze type, and a peak on the higher angle side corresponds to the (−601) plane thereof, the difference between the spacings ($d_{(003)}-d_{(-601)}$) is 0.0040 nm at largest. The titanic acid compound according to the present invention suffices if the titanic acid compound is a compound exhibiting the above-mentioned X-ray diffraction pattern and containing at least titanium and oxygen, and includes, other than usual titanium oxide, titanic acid and titanium hydroxide. Particularly, if the titanic acid compound is a titanic acid compound represented by the composition formula $H_xTi_yO_z$ ($0 \leq x/y \leq 0.25$, $2.0 \leq z/y \leq 2.2$), it is preferable because the titanic acid compound having such a crystal structure can easily be provided. The average particle diameter (50% median diameter by the electron microscopy) is not especially limited, but is usually in the range of 1 to 500 nm, and more preferably in the range of 1 to 100 nm. The particle shape can assume any of isotropic shapes such as spherical and polyhedral ones, anisotropic shapes such as rod-like and plate-like ones, amorphous shapes, and the like, and is not especially limited. The specific surface area is not especially limited, but is preferably in the range of 0.1 to 50 m²/g, and more preferably in the range of 0.1 to 20 m²/g.

In the titanic acid compound according to the present invention, if primary particles are aggregated to a secondary particle, it is preferable because powder characteristics such as the flowing property, adhering property and filling property are improved. The secondary particle in the present invention is in the state where primary particles are firmly bonded, is not a particle aggregated by the interaction between particles such as the van der Waals force, and not a particle mechanically compacted, and is not easily crumbled by industrial operations such as usual mixing, disintegration, filtration, water washing, transportation, weighing, bagging and deposition, and almost remains as a secondary particle. The average particle diameter (50% median diameter by the laser scattering method) of the secondary particle, depending on applications, is usually preferably in the range of 0.5 to 100 μm. The specific surface area is not especially limited, but is preferably in the range of 0.1 to 200 $m^2/g$, and more preferably in the range of 3 to 200 $m^2/g$. The particle shape also is not limited as in the primary particle, and various shapes can be used. In the case of the use as an electrode active material as described later, the pore volume is preferably in the range of 0.005 to 1.0 $cm^3/g$, and more preferably in the range of 0.05 to 1.0 $cm^3/g$. The measurement method of the pore volume involves, for example, a method in which nitrogen is made adsorbed by/desorbed from a sample at a liquid nitrogen temperature (77 K); a micropore volume and a micropore distribution are calculated from obtained adsorption/desorption isothermal curves by PH method; and a cumulative value of the micropore volume is defined as a pore volume.

The particle surface of the above-mentioned primary or secondary particle may be coated with at least one selected from the group consisting of carbon, inorganic compounds such as silica and alumina, and organic compounds such as a surfactant and a coupling agent. In the case of using two or more thereof, each thereof may be laminated one layer by one layer, or the particle surface may be coated with a mixture or a composite material of two or more thereof. The coating kind is suitably selected according to the purpose, but especially in the case of the use as an electrode active material, coating with carbon is preferable because of providing a good electric conductivity. The coating amount of carbon is preferably in the range of 0.05 to 10% by weight in terms of C with respect to a titanic acid compound according to the present invention in terms of $TiO_2$. The amount less than this range cannot provide a desired electric conductivity; and the amount more than the range instead decreases the characteristics. The more preferable coating amount is in the range of 0.1 to 5% by weight. The coating amount of carbon can be analyzed by CHN analysis method, the high-frequency combustion method or the like. Further, different elements other than titanium may be made to be contained in the range of not inhibiting the above-mentioned crystal form by doping or otherwise in the crystal lattice.

The next present invention is a process for producing a titanic acid compound, and is characterized by comprising reacting a layered alkali metal titanate salt represented by a composition formula $M_xM'_{x/3}Ti_{2-x/3}O_4$ (wherein M and M' denote the same or different alkali metals, and x is in the range of 0.50 to 1.0) with an acidic compound, and thereafter heat dehydrating the reaction product at a temperature in the range of 250 to 450° C.

A layered alkali metal titanate salt used in the present invention is one in which an alkali metal is intercalated between layers composed of titanium dioxide; and it is believed that in the case where M and M' in the composition formula are different, the layered alkali metal titanate salt is a compound in which M is present between the layers and M' is substituted for part of titanium in the titanium dioxide layer, and in the case where M and M' are the same, the salt is a compound in which some of titanium sites in the titanium dioxide layer makes defects. In the alkali metal titanate salt, M and M' in the composition formula may be at least one selected from lithium, sodium, potassium, rubidium and cesium, and these can be used with no limitation. In the case where M and M' are different, a preferable combination is lithium for M' and potassium, rubidium or cesium for M. Above all, a layered lithium potassium titanate represented by $K_{0.8}Li_{0.27}Ti_{1.73}O_4$ (M in the composition formula is potassium, and M' therein is lithium; and x=0.8) and a layered cesium titanate represented by $Cs_{0.7}Ti_{1.825}O_4$ (M and M' in the composition formula are cesium; and x=0.525) have a high stability and leave little of the alkali metal remaining after the reaction with an acidic compound, which are industrially preferable.

The layered alkali metal titanate salt can be obtained by mixing an alkali metal compound and a titanium compound in a proportion in the desired range in a dry system or wet system, and heating and calcining the mixture at a temperature in the range of 500 to 1,100° C., further preferably in the range of 600 to 900° C. The alkali metal compound usable is a carbonate, a sulfate, a hydroxide or the like of an alkali metal. The titanium compound usable is an oxide, a chloride or the like of titanium, or an organotitanium compound such as titanium alkoxide, and above all, use of an alkali metal carbonate and a titanic acid compound is preferable. The titanic acid compound to be used specifically includes titanium oxides such as titanium dioxide ($TiO_2$), and additionally titanic acids such as metatitanic acid ($H_2TiO_3$) and orthotitanicz acid ($H_4TiO_4$), and one or two or more selected from these can be used. These may be crystalline compounds or amorphous ones, and the form of the crystalline ones is rutile type, anatase type, brukite type or the like, and is not especially limited. For the calcination, a well-known heating calcination oven can be used such as a fluidized oven, a stationary oven, a rotary kiln, a tunnel kiln and the like. The calcination atmosphere can suitably be selected from in the air, in an inert gas and the like, and is suitably selected depending on the calcination apparatus, the calcination temperature and the like. After the calcination, according to the degree of the calcination, dry pulverization may be carried out using an impact crusher such as a hammer mill or a pin mill, a grinding crusher such as a roller mill, a pulverizer or a disintegrator, a compression crusher such as a roll crusher or a jaw crusher, and an airflow crusher such as a jet mill.

As an acidic compound reacted with the layered alkali metal titanate salt, use of an inorganic acid such as hydrochloric acid, sulfuric acid, nitric acid or hydrofluoric acid can easily progress the reaction, and hydrochloric acid and sulfuric acid are preferable because these are industrially advantageously used. The amount and the concentration of the acidic compound are not especially limited, but the amount is preferably 1 or more equivalent weights with respect to the total amount of an alkali metal contained in the layered alkali metal titanate salt, and the concentration of the acid is preferably 2 N or less, so that the layered alkali metal titanate salt does not dissolve. The reaction temperature is not especially limited, but the reaction is carried out preferably over 1 to 10 days at a temperature in the range of room temperature to 70° C., so that the layered alkali metal titanate salt hardly decomposes. The reaction product is believed to be a layered titanic acid compound in which alkali metals between layers of the layered alkali metal titanate salt and in the titanium dioxide layer are substituted for hydrogen, which can be confirmed by analysis of the alkali metal contained in the reaction product.

The obtained reaction product is solid-liquid separated and dried, and thereafter heat dehydrated at a temperature in the range described above. The heat dehydration can use a band heater, an electric furnace or the like, and the heating atmosphere may be either in the air or in an inert gas. The heat dehydration is believed to cause part or the whole of hydrogen contained between layers of the layered titanic acid compound as the reaction product to leave as crystal water, thus providing the titanic acid compound according to the present invention. Hence, a titanic acid compound of a desired composition can be obtained, for example, by controlling the dehydration amount from a titanic acid compound represented by the composition formula $H_xTi_yO_z$ ($0 \leq x/y \leq 0.25$, and $2.0 \leq z/y \leq 2.2$). Specifically, the heat dehydration is carried out so that a loss on heat becomes in the range of 0 to 2.0% by weight, using as an index the loss on heat of a heat dehydrated material in the temperature range of 300 to 600° C. by a differential thermo-balance. The heat dehydration, particularly, for 5 hours or more can easily control the dehydration amount and easily provides a titanic acid compound of the composition formula described above, which is preferable, and the heat dehydration for 10 hours or more is more preferable. Although a technology is conventionally known in which making hydrogen between layers leave by reacting a layered titanic acid compound and a basic compound exfoliates the layers to provide a lamellar titanium oxide, leaving of hydrogen by heating as in the present invention can bind interlayers to form a single particle.

A process for obtaining a secondary particle involves, for example, (A) granulating an alkali metal compound and a titanium compound and heating and calcining the granulated material to obtain a granulated material of the layered alkali metal titanate salt, and thereafter reacting and heating the granulated material with an acidic compound, (B) granulating the layered alkali metal titanate salt, and thereafter reacting the granulated material with an acidic compound and heat dehydrating the reacted material, or (C) obtaining a titanic acid compound and thereafter granulating it. The granulation includes dry granulation, stirring granulation and compression granulation, and the dry granulation is preferable because it can easily form a secondary particle firmly bonded. The dry granulation involves a process in which after dehydration of a slurry containing each compound or a starting material thereof, the dehydrated material is dried and pulverized, in which after dehydration of the slurry, the dehydrated material is molded and dried, or in which the slurry is spray dried, and above all, the spray drying is preferable, which can easily control the secondary particle diameter and the particle shape.

The spray drier used in spray drying may suitably be selected from a disk type, a pressure nozzle type, two-fluid nozzle type, four-fluid nozzle type ones and the like depending on the property of the slurry and the processing capability of the drier. The control of the secondary particle diameter may be made by controlling the size of liquid droplets sprayed, for example, in the case of the disk type drier, by regulating the rotation frequency of the disk, and in the cases of a pressure nozzle type, a two-fluid nozzle type and a four-fluid nozzle type drier and the like, by regulating the spray pressure and the nozzle diameter. With respect to the drying temperature, preferably, the inlet temperature is in the range of 150 to 250° C., and the outlet temperature is in the range of 70 to 120° C. After the spray drying, an obtained secondary particle may be further heat treated at a higher temperature than the spray drying temperature to regulate the pore volume.

If the granulation is carried out in the presence of the organic binder, for example, by adding an organic binder to a slurry containing the compounds described above or starting materials thereof, and drying and granulating the mixture, and the organic binder is removed from the obtained granulated material, it is more preferable because the pore volume is more easily controlled. The processes to remove an organic binder include (a) a process in which a secondary particle containing an organic binder is heat treated, and (b) a process in which it is acid leached, and the process (a), which does not generate a waste liquid, is industrially preferable. The organic binder can suitably be selected from well-known compounds permitting to be removed according to removal means. The addition amount of the organic binder is preferably in the range of 0.01 to 20% by weight, and more preferably in the range of 0.5 to 10% by weight in terms of $TiO_2$, with respect to the titanium compound for the process (A), with respect to the layered alkali metal titanate salt for the process (B), and with respect to the titanic acid compound for the process (C).

In the case where the process (a) described before is applied for removal of an organic binder, the kind of the binder is selected which can be decomposed and removed in the temperature range of 250 to 450° C., at which the titanic acid compound according to the present invention can be obtained. The organic binders to be used include, for example, (1) vinylic compounds (polyvinyl alcohol, polyvinylpyrrolidone, and the like), (2) cellulosic compounds (hydroxyethylcellulose, carboxymethylcellulose, methylcellulose, ethylcellulose, and the like), (3) proteinic compounds (gelatin, gum arabic, casein, sodium caseinate, ammonium caseinate, and the like), (4) acrylate compounds (sodium polyacrylate, ammonium polyacrylate, and the like), (5) natural polymeric compounds (starch, dextrin, agar, sodium alginate, and the like), and (6) synthetic polymeric compounds (polyethylene glycol, and the like). At least one selected from these can be used. Above all, compounds containing no inorganic component such as sodium are more preferable because they are easily decomposed and volatilized by the heat treatment.

Further, the production process according to the present invention may comprise a step of coating with at least one selected from the group consisting of carbon, inorganic compounds and organic compounds on the surface of the titanic acid compound according to the present invention. The coating process may be provided at any stage in the production process according to the present invention. The stages specifically include (1) a stage where a mixture of a titanium compound and an alkali metal compound is calcined, or after granulated, calcined, (2) a stage where an obtained layered alkali metal titanate salt or a granulated material thereof is reacted with an acidic compound, (3) a stage where an obtained reaction product or a granulated material thereof is heat dehydrated, and (4) a stage after a primary particle or a secondary particle of the titanic acid compound according to the present invention is obtained. The coating can be carried out at least at one stage selected from these stages.

The coating with carbon is carried out, for example, by adding a carbon-containing material at one of the stages described above and heating the resultant. The heating of the carbon-containing material may be carried out at any of the stages (1), (2) and (4), excluding the stage (3), which is carried out in a liquid phase. The heating temperature of a carbon-containing material is preferably in the range of 150 to 1,000° C.; and the heating atmosphere can suitably be selected from the air, a non-oxidative atmosphere and the like, but is preferably a non-oxidative atmosphere. The addition of a carbon-containing material may be carried out at any stage of the stages (1) to (4) as long as it is before the heating. In the case where a carbon material is added at the stage (1), a titanium compound and an alkali metal are mixed with the carbon-containing material, and heated at a temperature in the range of 500 to 1,000° C., which is preferable because the heating of the carbon-containing material and the generation of a layered alkali metal titanate salt can simultaneously be carried out. The more preferable calcination temperature is in the range of 600 to 900° C. Since an obtained layered alkali metal titanate salt or a granulated material thereof is coated with carbon, the material is supplied to the (2) and successive stages. In the case where a carbon-containing material is added at the stage (2), the carbon-containing material is added when the reaction with an acidic compound is carried out, and the resultant is supplied to the successive stage to heat the carbon-containing material. In the case where a carbon-containing material is added at the stage (3), heating the carbon-containing material and a reaction product, or a granulated material thereof at a predetermined temperature can simultaneously carry out the heating of the carbon-containing material and the generation of the titanic acid compound according to the present invention. The heating temperature is preferably in the range of 250 to 450° C. In the case where a carbon-containing material is added at the stage (4), the carbon-containing material is added to an obtained primary particle or secondary particle, and the mixture can be heated after the mixing or under mixing.

The carbon-containing materials include carbon black, acetylene black, Ketjen Black, and thermal decomposition products of organic compounds. In the case of using thermal decomposition products of an organic compound, coating with carbon may be carried out while the organic compound are added and heated at any stage as described before and this generates the thermal decomposition products, or the organic compound may be heated to generate the thermal decomposition products in advance and then these products may be used. The organic compound may be used in a solid or liquid state as it is, or in a gasified state. The kind of an organic compound to be used can suitably be selected, but if it is used for an electrode active material, it is preferably a hydrocarbon compound in which components other than carbon hardly remain and/or an oxygen-containing hydrocarbon compound. The hydrocarbon compounds include, for example, (A) alkane compounds (methane, ethane, propane, and the like), (B) alkene compounds (ethylene, propylene, and the like), (C) alkyne compounds (acetylene, and the like), and (D) cycloalkane compounds (cyclohexane, and the like), and (E) aromatic compounds (benzene, toluene, xylene, and the like). The oxygen-containing hydrocarbon compounds include, for example, (A) alcoholic compounds ((a) monohydric alcohols (methanol, ethanol, propanol, and the like), (b) dihydric alcohols (ethylene glycol, and the like), (c) trihydric alcohols (trimethylolethane, trimethylolpropane, and the like), (d) polyalcohols (polyvinyl alcohol, and the like), and the like), (B) etheric compounds ((a) ether monomers (diethyl ether, ethyl methyl ether, and the like)), (b) polyethers (polyethylene glycol, polyethylene oxide, polypropylene ether, and the like), and the like), (C)carboxylic compounds ((a) oxycarboxylic acids (citric acid, malic acid, and the like), (b) monocarboxylic acids (acetic acid, formic acid, and the like), (c) dicarboxylic acids (oxalic acid, malonic acid, and the like), (d) aromatic carboxylic acids (benzoic acid, and the like), and the like), (D) aldehyde compounds (formaldehyde, acetaldehyde, and the like), (E)phenolic compounds (phenol, catechol, pyrogallol, and the like), and (F) saccharides (glucose, sucrose, cellulose, and the like), and the like. In order to obtain a secondary particle having a surface coated with carbon, as an organic compound, selection of a compound to become a binder such as a polyalcohol or a polyether brings about the easy control of the pore volume, which is preferable.

In the case of coating with an inorganic compound, since if the coating is carried out at the stage (1), an obtained primary or secondary particle is easily doped with the component of the inorganic compound, the coating is carried out preferably at one of the stages (2) to (4). Specifically, in the case of the stage (2), the layered alkali metal titanate salt or a granulated material thereof; in the case of the stage (3), the reaction product, or a granulated material thereof; or in the case of the stage (4), the primary or secondary particle, is dispersed in an aqueous medium liquid or the like to make a slurry; and an inorganic compound or a starting material thereof is added to the slurry, and the mixture is neutralized and thereafter solid-liquid separated, and dried as required. After the coating is carried out at the stage (2) or (3), the resultant material is fed successively to processes thereafter. If the coating with the organic compound is carried out at one of the stages (1) to (3), since the organic compound is liable to be decomposed in the calcination and the heating carried out in the post-stage processes, the coating is carried out preferably at the stage (4); for example, the coating can be carried out by mixing the organic compound and the obtained primary or secondary particle using a stirrer or a crusher. Especially in the case of coating with a coupling agent, preferably, after the coupling agent is added in a slurry of the primary or secondary particle, and hydrolyzed, the solid-liquid separation is carried out.

After the titanic acid compound is obtained, it may be again made into a slurry, cleaned of impurities, classified, solid-liquid separated, and dried. Alternatively, depending on the degree of aggregation of particles, the titanic acid compound may be disintegrated in the range of not impairing the advantage of the present invention by using a well-known apparatus.

The present invention is an electrode active material, and is characterized by containing the above-mentioned titanic acid compound. Use of the electrode active material according to the present invention can provide a lithium battery having excellent cycle characteristics, and also having a much higher battery capacity. The cause is not yet clear, but it is presumed that the reason why two peaks are not clearly observed in proximity to a diffraction angle 44° of the titanic acid compound according to the present invention is because spacings in the atom arrangement causing these peaks are large or in disorder, and it is believed that such a structure is more advantageous for diffusion of lithium ions than a bronze-type titanium dioxide. If the diffusion of lithium ions becomes easy, not only the battery capacity becomes large, but also a decrease in the battery capacity due to charge/discharge of a lithium battery is supposedly unlikely to be caused because a load by the repetition of expansion and contraction by intercalation and deintercalation of lithium ions is unlikely to be placed on the structure of the titanic acid compound. Since the electrode active material according to the present invention has excellent rate characteristics, the material can be used as a material for a capacitor. In the case of using the material as an electrode active material, a material represented by the composition formula $H_xTi_yO_z$ ($0 \leq x/y \leq 0.25$, and $2.0 \leq z/y \leq 2.2$) is preferable.

If a secondary particle is used as an electrode active material, it is more preferable because a lithium battery having better cycle characteristics can be provided. It is presumed that since the secondary particle has spacings in the above-mentioned range inside, the structure of the electrode active material is hardly imparted with a load for reasons (1) that the infiltration of an electrolyte solution into the spacings makes easy the intercalation and deintercalation of lithium ions, (2) that the spacings buffer a load by the expansion and contraction, and other reasons, and a battery having excellent cycle characteristics is therefore provided. The shape of the secondary particle used as an electrode active material is advantageously a shape having the lowest possible anisotropy, preferably an isotropic shape, and more preferably a spherical shape, from the viewpoint of battery characteristics.

Further, the present invention is an electric storage device, and is characterized by using the above-mentioned electrode active material. The electric storage device specifically includes a lithium battery, a capacitor and the like; these are composed of such as an electrode, a counter electrode, a separator, and an electrolyte solution; and the electrode is obtained by adding a conductive material such as carbon black and a binder such as a fluororesin to the electrode active material, and suitably molding or applying the mixture. The electrode active material may be used concurrently with another electrode active material as required, such as a spinel-type lithium titanate ($Li_4Ti_5O_{12}$), as long as the another electrode active material provides almost the same battery characteristics. In the case of a lithium battery, the electrode active material is used as a positive electrode; metal lithium, a lithium alloy or the like, or a carbonaceous material such as graphite or coke, or the like can be used as a counter electrode. Alternatively, the electrode active material is used as a negative electrode; and as a counter electrode, also usable is a lithium-containing manganese oxide, a spinel-type lithium..different metal composite oxide ($LiM_2O_4$, M is at least one selected from Co, Ni, Mn, Mg and Al), a layered rocksalt-type lithium.different metal composite oxide ($LiMO_2$, M is at least one selected from Co, Ni, Mn, Mg and Al), an olivine-type lithium.phosphorus.different metal composite oxide ($LiMPO_4$, M is at least one selected from Fe, Co, Ni and Mn), vanadium pentaoxide, or the like. In the case of a capacitor, an asymmetric capacitor can be made in which the electrode active material is used for a negative electrode and an active carbon is used for a positive electrode. As the separator, a porous polyethylene film and the like are used for either; as the electrolyte solution, a material in common use can be used, such as a solution in which a lithium salt such as $LiPF_6$, $LiClO_4$, $LiCF_3SO_3$, $LiN(CF_3SO_2)_2$ or $LiBF_4$ is dissolved in a solvent such as propylene carbonate, ethylene carbonate or 1,2-dimethoxyethane.

EXAMPLES

Hereinafter, Examples of the present invention will be described, but the present invention is not limited thereto.

Example 1

Potassium carbonate, lithium carbonate, and as a titanic acid compound, a rutile-type titanium dioxide obtained by neutralizing and hydrolyzing titanium tetrachloride were mixed in a proportion of 3/1/6.5 in terms of molar ratio of K/Li/Ti, and well ground. The ground material was moved to a platinum crucible, and calcined in the air at a temperature of 800° C. for 5 hours using an electric furnace to obtain a layered lithium potassium titanate having a composition of $K_{0.8}Li_{0.27}Ti_{1.73}O_4$. 1 g of the obtained layered lithium potassium titanate was reacted with 100 cm³ of 1–N hydrochloric acid for 1 day at room temperature under stirring. The reaction product was analyzed and confirmed to contain almost no lithium or potassium and to be a layered titanic acid compound in which the alkali metal was almost replaced by hydrogen. Then, the layered titanic acid compound was filtered, water washed, dried, and thereafter heat dehydrated in the air at a temperature of 400° C. for 20 hours to obtain a titanic acid compound according to the present invention (Sample A). The loss on heat of Sample A was measured in the temperature range of 300 to 600° C. using a differential thermo-balance, and was observed to be a loss on heat of approximately 0.12% by weight. If the loss on heat is presumed to be originated from a slight amount of crystal water remaining in Sample A, the Sample is believed to have had a composition of $H_2Ti_{189}O_{379}$.

Example 2

A titanic acid compound (Sample B) according to the present invention was obtained as in Example 1, except for altering the heat dehydration temperature of the reaction product in Example 1 to 300° C. The loss on heat of 300 to 600° C. of Sample B was measured, and the result was 1.72% by weight; and if a presumption is made as in Example 1, Sample B is believed to have had a composition of $H_2Ti_{13}O_{27}$.

Comparative Example 1

20.0 g of a commercially available rutile-type high-purity titanium dioxide (PT-301, made by Ishihara Sangyo Kaisha Ltd.) and 8.85 g of sodium carbonate were mixed, and thereafter heated and calcined in the air at a temperature of 800° C. for 20 hours using an electric furnace, and thereafter again heated and calcined under the same conditions to obtain disodium trititanium heptaoxide. The obtained disodium trititanium heptaoxide was added to a hydrochloric acid aqueous solution of 1 mol in concentration so that the concentration thereof became 10 g/L, and reacted for 4 days to obtain dihydrogen trititanium heptaoxide. During the reaction, the hydrochloric acid aqueous solution was replaced every day. The obtained dihydrogen trititanium heptaoxide was filtered, washed, and solid-liquid separated, and dried in the air at a temperature of 60° C. for 12 hours, and thereafter heat dehydrated in the air at a temperature of 350° C. for 20 hours using an electric furnace to obtain a titanic acid compound as a comparative object (Sample C). The loss on heat of 300 to 600° C. of Sample C was measured, and the result was 0.50% by weight; and if a presumption is made as in Example 1, Sample C is believed to have had a composition of $H_2Ti_{45}O_{91}$.

Evaluation 1: Measurements of X-ray diffraction

Figure 1:
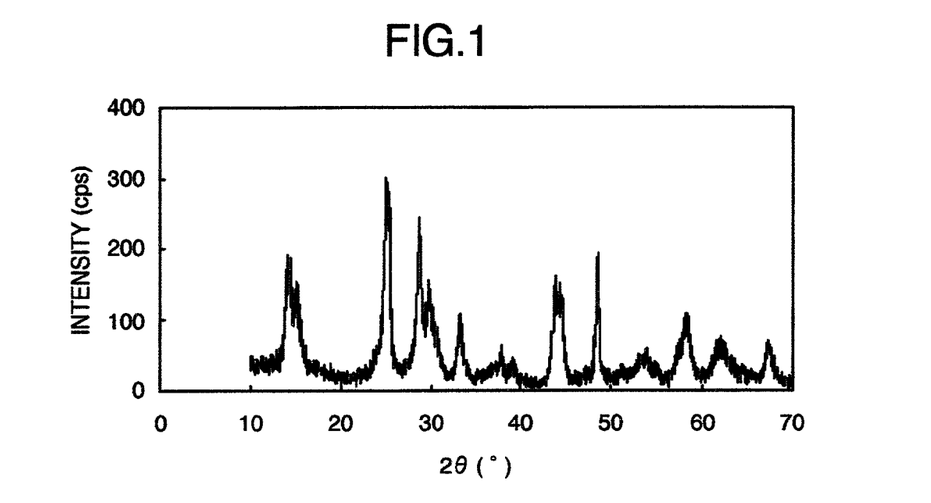
FIG. 1 is an X-ray diffraction chart of Sample A (Example 1)
Figure 2:
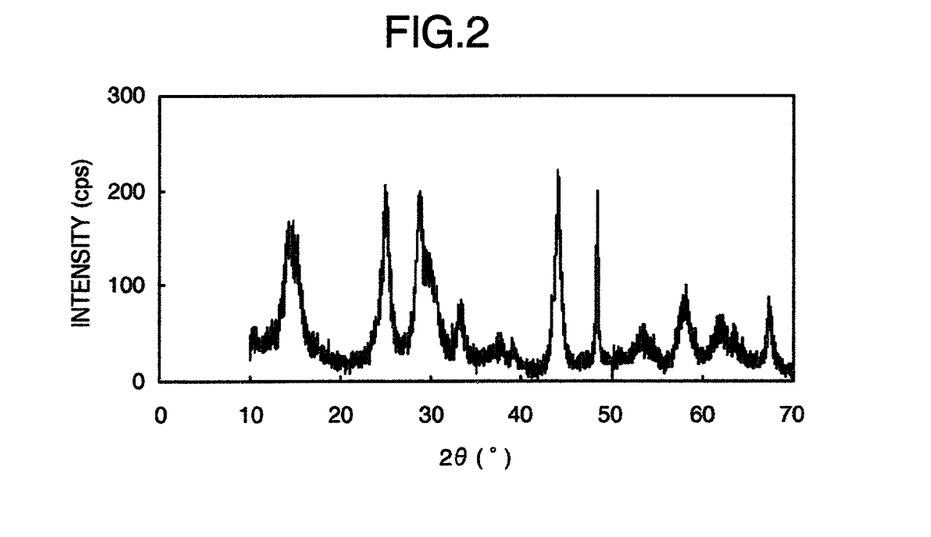
FIG. 2 is an X-ray diffraction chart of Sample B (Example 2)
Figure 3:
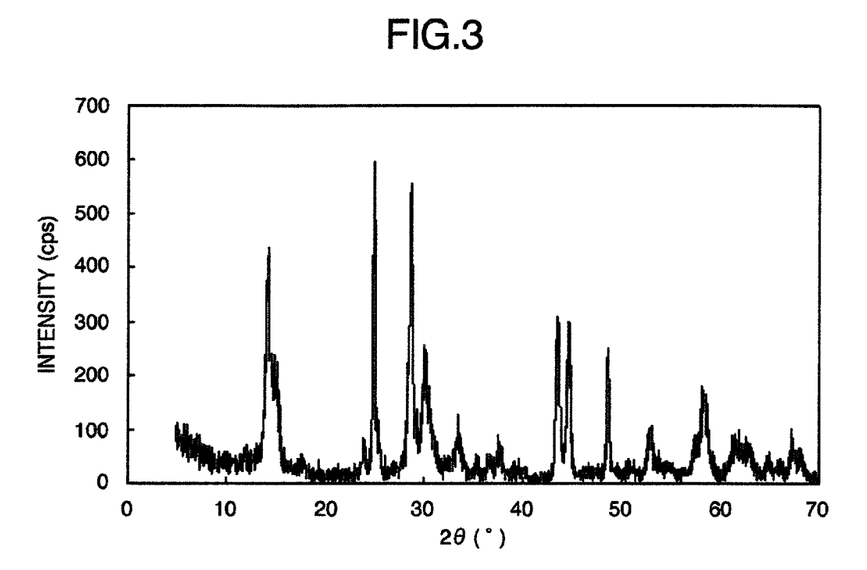
FIG. 3 is an X-ray diffraction chart of Sample C (Comparative Example 1).

The powder X-ray diffraction (X ray: Cu—Kα) of the titanic acid compounds (Samples A to C) obtained in Examples 1 and 2 and Comparative Example 1 was measured. The obtained X-ray diffraction charts are shown in FIGS. 1 to 3. The pattern of Sample A according to the present invention was nearly coincident with that of the well-known bronze-type titanium dioxide, but it is clear that although two peaks in proximity to a diffraction angle of 44° were observed, they were very proximate. With the assumption that a peak on the lower angle side corresponds to a (003) plane of a pattern of bronze type and a peak on the higher angle side corresponds to a (−601) plane, the difference between the spacings $(d_{(003)}-d_{(-601)})$ was 0.0040 nm or less. The pattern of Sample B also was nearly coincident with the pattern of bronze type, but substantially only one peak in proximity to 44° was observed.

TABLE 1

| Example | Sample | Composition Formula | x/y | z/y | $d_{(003)} - d_{(-601)}$ (nm) |
|---|---|---|---|---|---|
| Example 1 | A | $H_2Ti_{189}O_{379}$ | 0.01 | 2.01 | 0.0025 |
| Example 2 | B | $H_2Ti_{13}O_{27}$ | 0.15 | 2.07 | 0.0000 |
| Comparative Example 1 | C | $H_2Ti_{45}O_{91}$ | 0.04 | 2.02 | 0.0051 |

Evaluation 2: Evaluation of charge/discharge characteristics

Lithium secondary batteries were prepared using the titanic acid compounds (Samples A to C) obtained in Examples 1 and 2 and Comparative Example 1 as the electrode active material, and evaluated for their charge/discharge characteristics. Forms of the batteries and measurement conditions will be described.

Each Sample described above, an acetylene black powder as a conductive agent and a polytetrafluoroethylene resin as a binder were mixed in a weight ratio of 5:4:1, kneaded together in a mortar, and molded to 10 mm-diameter circular pellets. The weight of the pellets was 10 mg. An aluminum-made mesh cut into 10 mm diameter was overlapped on the pellet, and pressed at 9 MPa to make a working electrode.

The working electrode was vacuum dried at a temperature of 100° C. for 4 hours, and then incorporated in a sealable coin-type evaluation cell as a positive electrode in a glove box of −70° C. or lower in dew point. The evaluation cell used was made of a material of stainless steel (SUS316), and was of 20 mm in outer diameter and 3.2 mm in height. A negative electrode used was obtained by forming metal lithium of 0.5 mm in thickness into a circle of 12 mm in diameter. A non-aqueous electrolyte solution used was a mixed solution of ethylene carbonate and dimethyl carbonate (mixed in 1:2 in volume ratio) in which $LiPF_6$ was dissolved at a concentration of 1 mol/L.

The working electrode was placed on a lower can of the evaluation cell; a porous polypropylene film as a separator was placed thereon; and the non-aqueous electrolyte solution was dropped thereon. Further thereon, the negative electrode and a 0.5 mm thick spacer for thickness adjustment and a spring (either was made of SUS316) were mounted; an upper can equipped with a propylene-made gasket was covered; and the outer peripheral portion was caulked to seal the cell.

The measurement of the charge/discharge capacity was set in the voltage range of 1.0 to 2.5V at a charge/discharge current of 0.2 mA, and carried out at a constant current. The charge/discharge capacities at the 2nd cycle and the 30th cycle were measured; and (discharge capacity at the 30th cycle/discharge capacity at the 2nd cycle)×100 was defined as cycle characteristics. The larger value thereof means excellent cycle characteristics. The results are shown in Table 2. It is clear that the electrode active material according to the present invention has excellent cycle characteristics and a large charge/discharge capacity.

TABLE 2

| Example | Sample | 2nd Cycle Charge Capacity (mAh/g) | 2nd Cycle Discharge Capacity (mAh/g) | 30th Cycle Charge Capacity (mAh/g) | 30th Cycle Discharge Capacity (mAh/g) | Cycle Characteristic |
|---|---|---|---|---|---|---|
| Example 1 | A | 195 | 203 | 189 | 190 | 93.6 |
| Example 2 | B | 201 | 209 | 201 | 202 | 96.7 |
| Comparative Example 1 | C | 133 | 146 | 105 | 105 | 72.1 |

Evaluation 3: Evaluation of rate characteristics

The titanic acid compounds (Samples A and B) obtained in Examples 1 and 2, and a commercially available anatase-type titanium dioxide (ST-41, made by Ishihara Sangyo Kaisha Ltd., set as Comparative Example 2 (Sample D)) as a comparative object were used the electrode active material. The electrode active material, an acetylene black powder as a conductive agent, and a polyfluorovinilidene resin as a binder were mixed in 10:1:1 in weight ratio to prepare a paste. The paste was applied on an aluminum foil, dried at a temperature of 120° C. for 15 min, and thereafter punched out into a circle of 12 mm in diameter, and pressed at 14.7 MPa to make a working electrode. After the working electrode was vacuum dried at a temperature of 120° C. for 4 hours, a lithium secondary battery was fabricated as in Evaluation 2; and the discharge capacities were measured at various current quantities, and the capacity maintenance rates (%) were calculated. The measurement was carried out by setting the voltage range at 1.0 to 2.5 V for Samples A and B, and at 1.5 to 2.5 V for Sample D, the charge current at 40 mA/g, and the discharge current in the range of 0.25 to 3 C. The capacity maintenance rates, where a measurement value of a discharge capacity at 0.25 C was denoted as $X_{0.25}$, and measurement values in the range of 0.5 C to 3 C were denoted as $X_n$, were calculated by the expression: $(X_n/X_{0.25})\times 100$. Here, 1 C means a current value by which the full charge can be carried out in 1 hour, and in the present evaluation, 160 mA/g corresponds to 1 C. The results are shown in Table 3. It is clear that the electrode active material according to the present invention has a high capacity maintenance rate and excellent rate characteristics even if the current quantity is made large.

TABLE 3

| | Sample | Capacity Maintenance Rate (%) | | | | |
| | | 0.25 C | 0.5 C | 1 C | 2 C | 3 C |
|---|---|---|---|---|---|---|
| Example 1 | A | 100 | 94 | 86 | 77 | 70 |
| Example 2 | B | 100 | 94 | 85 | 74 | 67 |
| Comparative Example 2 | D | 100 | 70 | 39 | 20 | 12 |

Industrial Applicability

The titanic acid compound according to the present invention is useful as an electrode active material, a photocatalyst, a catalyst, an ultraviolet absorbent, and the like. The electrode active material according to the present invention is useful for a lithium battery excellent in cycle characteristics.

The invention claimed is:

1. A titanic acid compound having an X-ray diffraction pattern equivalent to that of a bronze titanium dioxide except for peaks of a (003) plane and a (−601) plane and having a difference between spacing of the (003) plane and the (−601)

plane, $(d_{(003)}-d_{(-601)})$ of 0.0040 nm or lower, wherein the titanic acid compound represented by a composition formula is selected from the group consisting of $H_2Ti_{189}O_{379}$ and $H_2Ti_{13}O_{27}$.

2. A process for producing a titanic acid compound according to claim 1, comprising:
  reacting a layered alkali metal titanate salt represented by a composition formula $M_xM'_{x/3}Ti_{2-x/3}O_4$, wherein M and M' denote a same or different alkali metal, and x is in a range of 0.50 to 1.0 with an acidic compound; and thereafter,
  heat dehydrating thus obtained product at a temperature in a range of 250 to 450° C.

3. The process for producing the titanic acid compound according to claim 2, wherein the layered alkali metal titanate salt is $K_{0.8}Li_{0.27}Ti_{1.73}O_4$ or $Cs_{0.7}Ti_{1.825}O_4$.

4. The process for producing the titanic acid compound according to claim 2, wherein the heat dehydration is carried out for 5 hours or more.

5. An electrode active material comprising the titanic acid compound according to claim 1.

6. An electric storage device comprising the electrode active material according to claim 5.

* * * * *